United States Patent
Gotoh

(10) Patent No.: US 7,751,292 B2
(45) Date of Patent: Jul. 6, 2010

(54) CONTROL DEVICE, CONTROL METHOD, RECORDING DEVICE AND RECORDING METHOD FOR RECORDING REAL-TIME AND NON-REAL TIME DATA ON RECORDING MEDIUM

(75) Inventor: Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 10/597,609

(22) PCT Filed: Feb. 1, 2005

(86) PCT No.: PCT/JP2005/001431

§ 371 (c)(1),
(2), (4) Date: May 9, 2008

(87) PCT Pub. No.: WO2005/076275

PCT Pub. Date: Aug. 18, 2005

(65) Prior Publication Data

US 2008/0219138 A1    Sep. 11, 2008

(30) Foreign Application Priority Data

Feb. 3, 2004    (JP) ............................. 2004-026437

(51) Int. Cl.
*G11B 11/00* (2006.01)
(52) U.S. Cl. ................... 369/53.24; 369/275.3
(58) Field of Classification Search ............ 369/30.03, 369/30.04, 30.07, 30.08, 53.24
See application file for complete search history.

(56) References Cited

U.S. PATENT DOCUMENTS 6,999,674 B1    2/2006    Hamada et al.

(Continued)

FOREIGN PATENT DOCUMENTS

EP    1103974    5/2001

(Continued)

OTHER PUBLICATIONS

Office Action dated Apr. 28, 2008 issued for the corresponding Korean Patent Application No. 10-2006-7017997 and the English translation thereof.

(Continued)

*Primary Examiner*—Tan X Dinh
(74) *Attorney, Agent, or Firm*—Renner, Otto, Boisselle & Sklar, LLP

(57) ABSTRACT

The control device (610) controls the recording of data onto an information recording medium where the number of re-writing data onto the same area is limited. The control device (610) determines whether data to be recorded is real-time data or non-real-time data (S1). When it is determined that the data to be recorded is real-time data, the real-time data is recorded in a circular manner onto a second area which is defined in advance within a first area which is assigned in advance on the information recording medium (S2 to S5). When it is determined that the data to be recorded is non-real-time data, the search for an unassigned area is performed from a predetermined address within the first area. The non-real-time data is recorded onto the unassigned area found as a result of the search (S6 and S7). The search for the unassigned area for recording the non-real-time data is also performed in the second area within the first area (S6).

8 Claims, 5 Drawing Sheets

U.S. PATENT DOCUMENTS

| | | | |
|---|---|---|---|
| 7,603,520 B2 * | 10/2009 | Furukawa et al. | 711/118 |
| 2006/0236023 A1 * | 10/2006 | Furukawa et al. | 711/100 |
| 2007/0003214 A1 * | 1/2007 | Toyoda et al. | 386/68 |
| 2007/0077024 A1 * | 4/2007 | Toyoda et al. | 386/68 |
| 2007/0201816 A1 * | 8/2007 | Sasaki | 386/52 |

FOREIGN PATENT DOCUMENTS

| | | | | |
|---|---|---|---|---|
| JP | 01-251322 | 10/1989 | | |
| JP | 05-006296 | 1/1993 | | |
| JP | 07-220400 | 8/1995 | | |
| JP | 11-232842 | 8/1999 | | |
| JP | 2001-157145 | 6/2001 | | |
| JP | 2002-216421 | 8/2002 | | |
| JP | 2006-120200 | * 11/2006 | | 369/53.24 |
| KR | 2001-51898 | 6/2001 | | |
| WO | 02/052568 | 7/2002 | | |

OTHER PUBLICATIONS

Chinese Office Action for corresponding application No. 2005/80010418 issued Mar. 6, 2009 (with English Translation.
International Search Report for corresponding Application No. PCT/JP2005/001431 mailed Apr. 26, 2005.

* cited by examiner

CONTROL DEVICE, CONTROL METHOD, RECORDING DEVICE AND RECORDING METHOD FOR RECORDING REAL-TIME AND NON-REAL TIME DATA ON RECORDING MEDIUM

TECHNICAL FIELD

The present invention relates to a control device for controlling the recording of data onto an information recording medium where the number of re-writing data onto the same area is limited, a control method, a recording device and a recording method.

BACKGROUND ART

An optical disc is an example of an information recording medium having a sector structure. In recent years, optical discs have been developed so as to have a higher density and a larger capacity. In particular, the number of times data can be re-written in the same area tends to be reduced due to the increase of the density. When an optical disc where the number of re-writing data onto the same area is limited is used, it is necessary to avoid recording data repeatedly into a specific area of the optical disc. As one of the methods for avoiding recording data repeatedly, a one-way recording method (a circular recording method) has been proposed.

A data processing device for performing the circular recording method is known (See Reference 1). This data processing device records, onto a disc, an address indicating the position from which a search for an unassigned area is started, and searches for an unassigned area (a free space) in a direction from the position indicated by the address to the position corresponding to the larger addresses.

Reference 1: Japanese Laid-Open Publication No. 4-120634

DISCLOSURE OF THE INVENTION

When the circular recording method is used, the problem relating to the limitation of the number of re-writing audio/video data can be solved. However, normal data other than the audio/video data is also recorded dispersedly on the optical disc. Thus, a problem arises where it takes time to reproduce such dispersed data. Since the normal data is required to have high reliability, there is the possibility that the defective area is replaced with a replacement area positioned on the inner circumference or the outer circumference of the optical disc, by the defect management system using a linear replacement method. When the area where data is to be recorded is far from the replacement area, an additional problem arises where it takes an even longer time to reproduce the data.

The present invention is made to solve these problems. The purpose of the present invention is to provide a control device, a control method, a recording device and a recording method, which are capable of providing a higher priority to the recording of non-real-time data even if the recording positions of the non-real-time data are more or less apart from each other, in the case where both the real-time data and the non-real-time data are to be recorded.

A control device of the present invention is for controlling the recording of data onto an information recording medium where the number of re-writing data onto the same area is limited. The control device includes: means for determining whether data to be recorded is real-time data or non-real-time data; means for, when it is determined that the data to be recorded is real-time data, recording the real-time data in a circular manner onto a second area which is defined in advance within a first area which is assigned in advance on the information recording medium; and means for, when it is determined that the data to be recorded is non-real-time data, searching for an unassigned area from a predetermined address within the first area and recording the non-real-time data onto the unassigned area found as a result of the search, wherein the search for the unassigned area for recording the non-real-time data is also performed in the second area within the first area, thereby achieving the purpose described above.

The non-real-time data may include data for an index file, data for a clip information file and data for a playlist file, the search for the unassigned area for recording the data for the index file may be started from a leading address of the first area, and the search for the unassigned area for recording the data for the clip information file or the data for the playlist file may be started from an area adjacent to an area where the data for the index file has been recorded.

The non-real-time data may include data for a clip information file and data for a playlist file, the search for the unassigned area for recording the data for the clip information file may be performed in a predetermined direction from an area adjacent to an area where the data for the playlist file has been recorded, and the search for the unassigned area for the data for the playlist file may be performed in a direction opposite to the predetermined direction from an area adjacent to an area where the data for the clip information file has been recorded.

A control method of the present invention is for controlling the recording of data onto an information recording medium where the number of re-writing data onto the same area is limited. The control method includes the steps of: determining whether data to be recorded is real-time data or non-real-time data; when it is determined that the data to be recorded is real-time data, recording the real-time data in a circular manner onto a second area which is defined in advance within a first area which is assigned in advance on the information recording medium; and when it is determined that the data to be recorded is non-real-time data, searching for an unassigned area from a predetermined address within the first area and recording the non-real-time data onto the unassigned area found as a result of the search, wherein the search for the unassigned area for recording the non-real-time data is also performed in the second area within the first area, thereby achieving the purpose described above.

The non-real-time data may include data for an index file, data for a clip information file and data for a playlist file, the search for the unassigned area for recording the data for the index file may be started from a leading address of the first area, and the search for the unassigned area for recording the data for the clip information file or the data for the playlist file may be started from an area adjacent to an area where the data for the index file has been recorded.

The non-real-time data may include data for a clip information file and data for a playlist file, the search for the unassigned area for recording the data for the clip information file may be performed in a predetermined direction from an area adjacent to an area where the data for the playlist file has been recorded, and the search for the unassigned area for the data for the playlist file may be performed in a direction opposite to the predetermined direction from an area adjacent to an area where the data for the clip information file has been recorded.

A recording device of the present invention includes: a drive device for recording data onto an information recording medium where the number of re-writing data onto the same area is limited; and a control device for controlling the drive device, wherein the control device includes: means for determining whether data to be recorded is real-time data or non-real-time data; means for, when it is determined that the data to be recorded is real-time data, recording the real-time data in a circular manner onto a second area which is defined in advance within a first area which is assigned in advance on the information recording medium; and means for, when it is determined that the data to be recorded is non-real-time data, searching for an unassigned area from a predetermined address within the first area and recording the non-real-time data onto the unassigned area found as a result of the search, wherein the search for the unassigned area for recording the non-real-time data is also performed in the second area within the first area, thereby achieving the purpose described above.

A recording method of the present invention includes the steps of: recording data onto an information recording medium where the number of re-writing data onto the same area is limited; and controlling the recording of the data, wherein the step of controlling the recording of the data includes the steps of: determining whether data to be recorded is real-time data or non-real-time data; when it is determined that the data to be recorded is real-time data, recording the real-time data in a circular manner onto a second area which is defined in advance within a first area which is assigned in advance on the information recording medium; and when it is determined that the data to be recorded is non-real-time data, searching for an unassigned area from a predetermined address within the first area and recording the non-real-time data onto the unassigned area found as a result of the search, wherein the search for the unassigned area for recording the non-real-time data is also performed in the second area within the first area, thereby achieving the purpose described above.

According to the present invention, the real-time data is recorded in a circular manner into the second area which is defined in advance within the first area, and the search for the unassigned area for recording the non-real-time data is also performed in the second area within the first area. This arrangement makes it possible to record the non-real-time data into a part of the second area, in the case where the unassigned area for recording the non-real-time data is insufficient. As a result, it is possible to provide a higher priority to the recording of the non-real-time data, even if the recording positions of the non-real-time data are more or less apart from each other.

Figure 1:
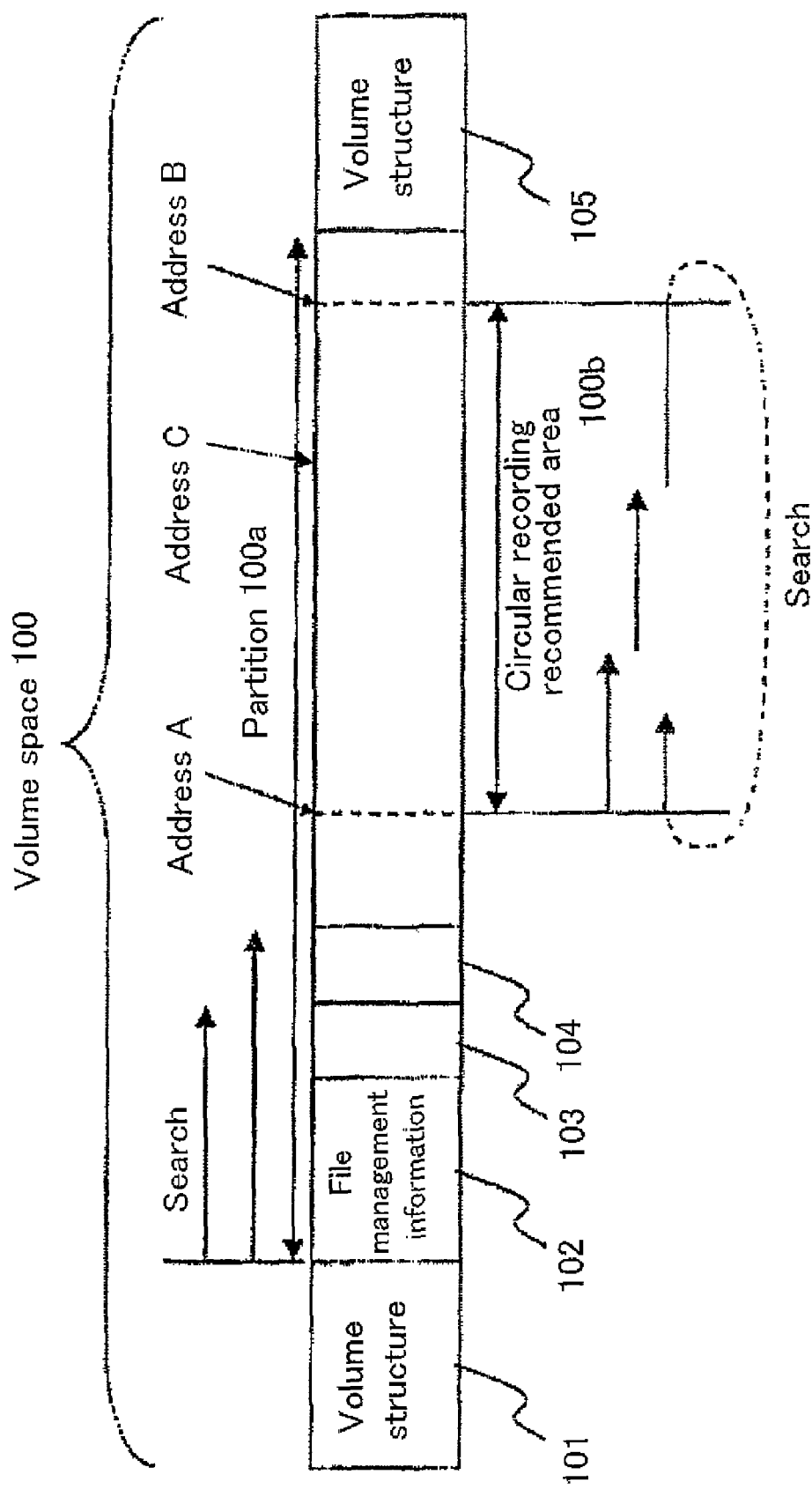
FIG. 1 is a drawing showing an example of the data structure of an information recording medium according to the present invention.

100 volume space
100a partition
100b circular recording recommended area
101, 105 volume structure
102 file management information
103, 104 non-real-time data
600 information recording/reproduction device
610 system control device
611 control unit
612 memory
620 drive device
630 interface

BEST MODE FOR CARRYING OUT THE INVENTION

Hereinafter, embodiments of the present invention will be described with reference to the drawings.

FIG. 1 shows an example of the data structure of an information recording medium according to the present invention. The information recording medium may be an optical disc, for example. The following is described based on the assumption that the information recording medium is an optical disc.

On the information recording medium, a volume space 100 onto which data can be recorded is defined. The number of re-writing data onto the same area within the volume space 100 is limited.

The volume space 100 is configured such that two types of data (i.e., real-time data and non-real-time data) can be recorded onto the volume space 100. The real-time data is referred to as data which is required to be reproduced continuously without any interruption. Audio/video data, which includes at least one of audio data and video data, is an example of the real-time data. The non-real-time data is referred to as data which is not required to be reproduced continuously. Data for managing the audio/video data is an example of the non-real-time data. In the present specification, the non-real-time data may be also referred to as "normal data".

A first area is assigned to the volume space 100 in advance. The first area is, for example, a partition 100a which is defined in a file system.

A second area is defined within the first area in advance. The second area is, for example, a circular recording recommended area 100b. The circular recording recommended area 100b is defined as an area from address A to address B. The address A and the address B are predetermined addresses.

Real-time data is recorded in a circular manner onto the second area (e.g., the circular recording recommended area 100b). The circular recording of the real-time data is achieved by, for example, searching for an unassigned area within the circular recording recommended area 100b and recording the real-time data onto the unassigned area found as a result of the search. The search for an unassigned area within the circular recording recommended area 100b is performed in a predetermined direction (e.g., a direction from the inner circumference of the optical disc to the outer circumference of the optical disc) from a search start address (e.g., address C). In the case where no unassigned area has been found before the search reaches the ending address of the circular recording recommended area 100b (i.e., address B), the search for an unassigned area within the circular recording recommended area 100b returns to the leading address of the circular recording recommended area 100b (i.e., address A), and the search is performed in the predetermined direction from the leading address (i.e., address A). In the case where an unassigned area having a sufficient size where the real-time data can be recorded is found as a result of the search, the real-time data is recorded onto the unassigned area which has been found.

The search start address may be, for example, an address next to the ending address of the area where the real-time data has been recorded most recently.

Non-real-time data is recorded onto the first area (e.g., the partition 100a). The recording of the non-real-time data is achieved by, for example, searching for an unassigned area within the partition 100a and recording the non-real-time data onto the unassigned area found as a result of the search. The search for an unassigned area within the partition 100a is performed, for example, in a predetermined direction (e.g., a direction from the inner circumference of the optical disc to the outer circumference of the optical disc) from the leading address of the partition 100a to the ending address of the partition 100a. In the case where an unassigned area having a sufficient size where the non-real-time data can be recorded is found as a result of the search, the non-real-time data is recorded onto the unassigned area which has been found.

During the search for an unassigned area within the partition 100a for recording the non-real-time data, in the case where no unassigned area has been found before the search reaches the leading address of the circular recording recommended area 100b (i.e., the address A), the search is continued in the predetermined direction from the leading address of the circular recording recommended area 100b (i.e., the address A). In the case where an unassigned area having a sufficient size where the non-real-time data can be recorded is found in the circular recording recommended area 100b as a result of the search, the non-real-time data is recorded onto the unassigned area which has been found.

In the example shown in FIG. 1, the volume structure 101 used in the file system is recorded on the inner circumference of the optical disc, and the volume structure 105 used in the file system is recorded on the outer circumference of the optical disc. The file management information 102 (non-real-time data) is recorded so as to be positioned adjacent to the volume structure 101 recorded on the inner circumference of the optical disc. In the case where there exists an unassigned area adjacent to the area where the file management information 102 is recorded, the non-real-time data 103 and 104 are recorded onto the unassigned area adjacent to the area where the file management information 102 is recorded, as shown in FIG. 1. On the other hand, in the case where there is no unassigned area for recording non-real-time data between the area where the file management information 102 is recorded and the address A, but there is an unassigned area within the circular recording recommended area 100b where non-real-time data can be recorded, the non-real-time data is recorded onto the unassigned area which exists within the circular recording recommended area 100b. In this way, when there does not exist sufficient unassigned area for recording non-real-time data, it is allowed to record the non-real-time data onto a part of the circular recording recommended area 100b. This makes it possible to provide a priority to the recording of the non-real-time data, even if their recording positions may be more or less apart from each other. As a result, it is possible to effectively utilize the unassigned areas according to the status of use of the optical disc.

The position and the size of the circular recording recommended area 100b may be varied according to the situation of replacement areas which are arranged on the optical disc. For example, on an optical disc such as a DVD-RAM or the like, it is possible to arrange replacement areas having variable sizes at two positions of the optical disc (e.g., one position is on the inner circumference of the optical disc and the other position is on the outer circumference of the optical disc). In the case where a defective area is detected when non-real-time data is to be recorded, the defective area is replaced by the replacement area. Accordingly, it is possible to set the position and the size of the circular recording recommended area 100b such that more non-real-time data are recorded on the side on which more replacement areas are arranged.

The search for an unassigned area for recording non-real-time data may be performed with a higher priority with respect to areas within the partition 100a other than the circular recording recommended area 100b. For example, it is possible that a search is performed in an area before the circular recording recommended area 100b, and if no unassigned area has been found in the search, then a search is performed in an area after the circular recording recommended area 100b. It is also possible that, if still no unassigned area has been found, the search may be performed in the circular recording recommended area 100b.

Since real-time data is required to be reproduced continuously, it is prohibited to replace a defective area which is detected during the recording of real-time data with a replacement area using the linear replacement method. Further, since non-real-time data is required to have high reliability, a verification process is performed during the recording of non-real-time data.

Figure 2:
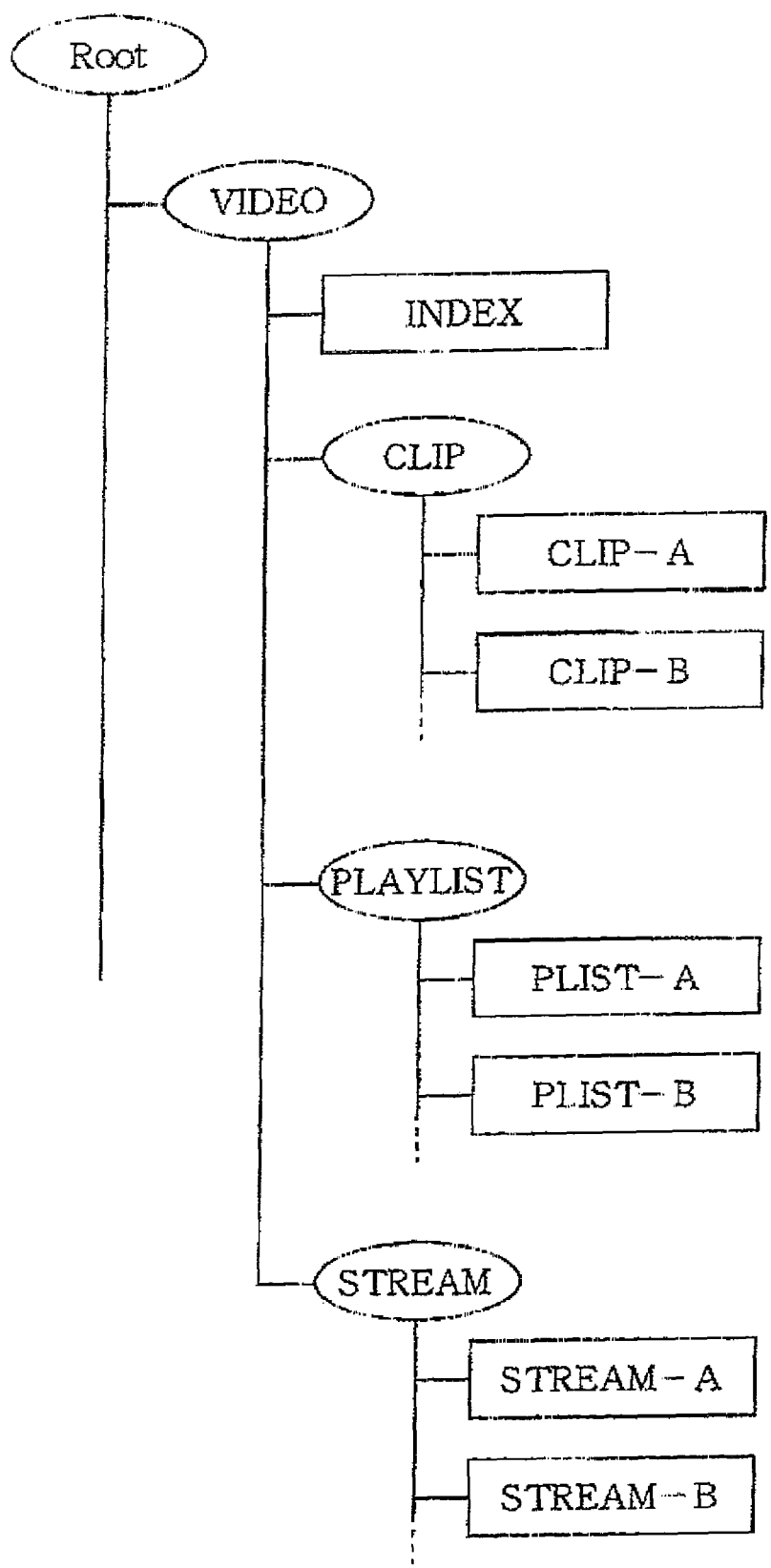
FIG. 2 is a drawing showing an example of the directory configuration of a file used in an audio/video application (an AV application) for recording or reproducing audio/video data.

FIG. 2 shows an example of the directory configuration of a file used in an audio/video application (an AV application) for recording or reproducing audio/video data. The file used in the AV application is registered under the VIDEO directory, which is subordinate to the ROOT directory. Being subordinate to the VIDEO directory are an index file "INDEX", the STREAM directory in which stream files including audio/video data are registered, the CLIP directory in which clip information files including time search information and the like for the audio/video data recorded on the optical disc are registered, and the PLAYLIST directory in which playlist files used for managing the order in which the pieces of audio/video data recorded on the optical disc are to be reproduced are registered. In order to reproduce the audio/video data, it is necessary to, before reproducing the stream files, read and process the index file, the clip information files and the playlist files.

The index file is used for managing a list of files which are used in the AV application recorded on the optical disc. The index file includes the non-real-time data which is read first at the time when the AV application reproduces the data. The clip information files and the playlist files are also files which include the non-real-time data which is read at the time when the AV application reproduces the data. For example, in the case where it is displayed in a menu format which contents are to be reproduced before the audio/video data is reproduced, it is necessary to, before reading the stream files, read the playlist files under the PLAYLIST directory. This arrangement is made such that the image output starts immediately after the user selects a predetermined menu. In the case where a special reproduction such as a fast-forward reproduction is performed on the audio/video data, it is necessary to, before reading the stream files, read the clip information files under the CLIP directory and to refer to the information for time search recorded in the clip information files. For example, in the case where a high-speed fast-forward reproduction is performed on a plurality of stream files recorded on the optical disc, it is necessary to, before reading the stream files, read all the clip information files under the CLIP directory.

Thus, it is preferable to record the specific files which are registered under the specific directories, such as the CLIP directory and the PLAYLIST directory, into the areas which are positioned continuously as much as possible. This is because it is possible to improve the speed at which these files are read by recording these files into the areas which are positioned continuously as much as possible. When generating the clip information files and the playlist files, the AV application is able to limit the number of files generated under the CLIP directory and the PLAYLIST directory and also to limit the total volume of the files generated under each of the directories. By setting such limits, it is possible to shorten the time required for accessing these files.

Figure 3:
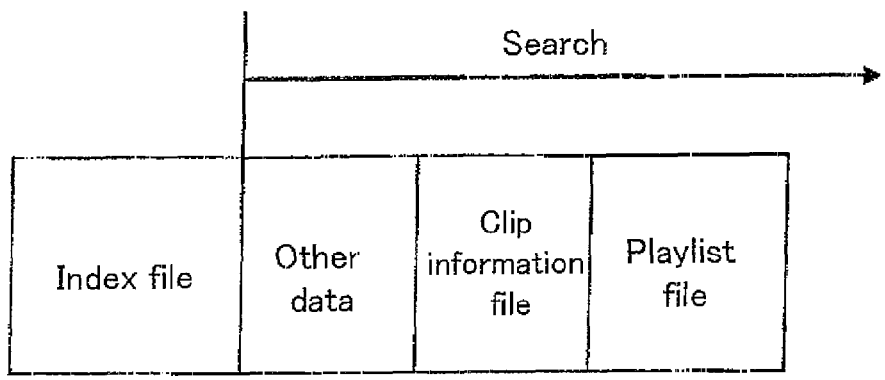
FIG. 3 is a drawing explaining a method for recording a clip information file and a playlist file.

FIG. 3 is a drawing for explaining a method for recording the clip information files and the playlist files.

One or more clip information files under the CLIP directory are collectively recorded into areas which are positioned continuously within the partition 100a. The recording of one or more clip information files is achieved by searching for an unassigned area in a particular direction (e.g., a direction from the inner circumference of the optical disc to the outer circumference of the optical disc) from an area adjacent to the area in which the index file is recorded, and by recording one or more clip information files into the unassigned area found as a result of the search.

One or more playlist files under the PLAYLIST directory are collectively recorded into areas which are positioned continuously within the partition 100a. The recording of one or more playlist files is achieved by searching for an unassigned area in a particular direction (e.g., a direction from the inner circumference of the optical disc to the outer circumference of the optical disc) from an area adjacent to the area in which the index file is recorded, and by recording one or more playlist information files into the unassigned area found as a result of the search.

The clip information files and the playlist files are files including non-real-time data which is to be recorded while performing a verification process. The search for the unassigned areas for recording these files does not start from the leading address of the partition 101a, but starts from an area adjacent to the area in which the index file is recorded (e.g., an address next to the ending address of the area in which the index file is recorded). By performing the search for the unassigned areas in this way, it is possible to arrange the clip information files and the playlist files such that they are positioned as close to the index file as possible. Further, in the case where the updating number of the index file is increased and the defective areas caused by re-writing fatigue is increased, it is possible to move the index file to a different area. This makes it possible to eliminate additional accesses which may be caused by the replacement of the defective areas with replacement areas.

Figure 4:
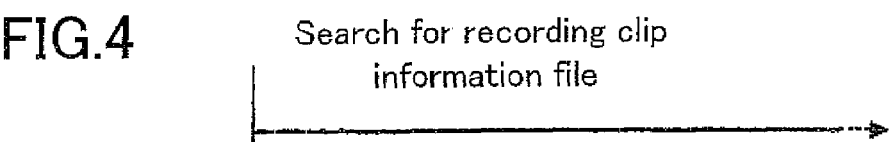
FIG. 4 is a drawing explaining another method for recording a clip information file and a playlist file.
Figure 4:
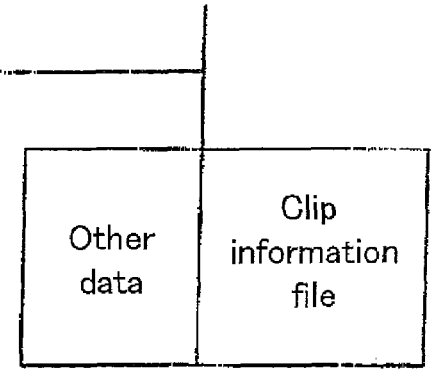

FIG. 4 is a drawing for explaining another method for recording the clip information files and the playlist files.

One or more clip information files under the CLIP directory are collectively recorded into areas which are positioned continuously within the partition 100a. The recording of one or more clip information files is achieved by searching for an unassigned area in a particular direction (e.g., a direction from the inner circumference of the optical disc to the outer circumference of the optical disc) from an area adjacent to the area in which one or more playlist files are recorded, and by recording one or more clip information files into the unassigned area found as a result of the search.

One or more playlist files under the PLAYLIST directory are collectively recorded into areas which are positioned continuously within the partition 100a. The recording of one or more playlist files is achieved by searching for an unassigned area in a direction opposite to the particular direction (e.g., a direction from the outer circumference of the optical disc to the inner circumference of the optical disc) from an area adjacent to the area in which one or more clip information files are recorded, and recording one or more playlist files into the unassigned area found as a result of the search.

By performing the search for the unassigned areas in this way, even if an unassigned area is divided or even if other data is recorded in a mixed manner, it is possible to arrange the clip information files and the playlist files such that they are positioned as close to one another as possible.

By recording, in a circular manner, the stream files including the audio/video data under the STREAM directory into the circular recording recommended area 100b which is defined in advance within the partition 100a, it is possible to prevent the re-writing process from concentrating in one specific area. In the case where the area in which the index file has been recorded has a defect due to an updating recording of the index file, it is possible that a search for an unassigned area is performed from the leading address of the partition 100a, and the index file is recorded into the unassigned area found as a result of the search. Further, it is possible that the search for unassigned areas for recording the clip information files and the playlist files is started from an area adjacent to the area in which the index file has been recorded. In this case, it is possible to arrange the clip information files and the playlist files such that they are positioned as close to the index file as possible.

Figure 5:
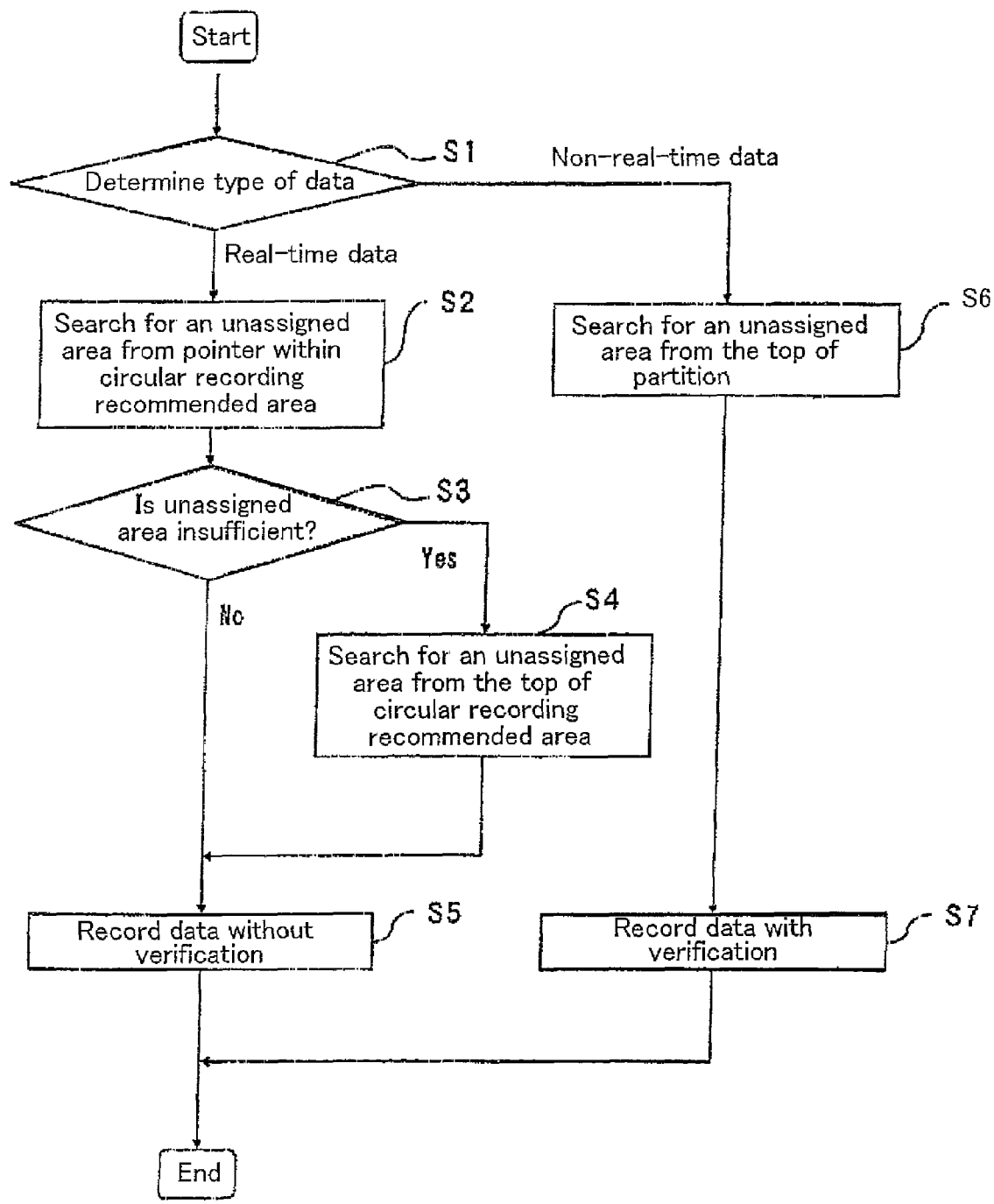
FIG. 5 is a flowchart showing an example of the procedure of the recording method according to the present invention.

FIG. 5 shows an example of the procedure of the recording method according to the present invention. The procedure of the recording method shown in FIG. 5 may be implemented, for example, by having a computer execute a program representing a process for recording data.

In step S1, it is determined whether the data to be recorded onto the optical disc is real-time data or non-real-time data. This determination is made, for example, by determining whether or not the data to be recorded onto the optical disc is audio/video data. In the case where it is determined that the data to be recorded onto the optical disc is real-time data, the process goes to step S2. In the case where it is determined that the data to be recorded onto the optical disc is non-real-time data, the process goes to step S6.

In step S2, a search for an unassigned area for recording the real-time-data is performed. This search is performed in a predetermined direction from the search start address within the circular recording recommended area 100b. The search start address may be, for example, an address next to the ending address of the area in which data is recorded most recently, within the circular recording recommended area 100b. The predetermined direction may be, for example, a direction from a sector having a smaller sector number to a sector having a larger sector number. The sector numbers may be physical sector numbers or logical sector numbers.

In step S3, it is determined whether the unassigned area found in the search in step S2 has an insufficient size to record the real-time data therein.

In the case where the determination result in step S3 is "Yes", the process goes to step S4. In the case where the determination result in step S3 is "No", the process goes to step S5. In step S4, a search for an unassigned area for recording the real-time data is performed in a pre-determined direction from the leading address of the circular recording recommended area 100b.

In step S5, the unassigned area found in the search in step S2 or in step S4 is assigned as an area for recording the real-time data. The real-time data is then recorded into the assigned area without performing a verification process.

In step S6, a search for an unassigned area for recording non-real-time data is performed. This search is performed in a predetermined direction from the leading address of the partition 100a. The predetermined direction may be, for example, a direction from a sector having a smaller sector number to a sector having a larger sector number. The sector numbers may be physical sector numbers or logical sector numbers.

The position (i.e., the address) at which the search in step S6 is started may be changed in accordance with the type of non-real-time data. For example, in the case where the non-real-time data is data for an index file, the position at which the search in step S6 is started may be the leading address of the partition 100a. In the case where the non-real-time data is data for a clip information file or data for a playlist file, the position at which the search in step S6 is started may be an address next to the ending address of the area in which the index file has been recorded.

The search for an unassigned area in step S6 may be performed by giving a priority to the areas within the partition 100a other than the circular recording recommended area 100b. For example, the search for an unassigned area may be performed, in the order of an area before circular recording recommended area 100b, an area after circular recording recommended area 100b and the circular recording recommended area 100b.

In step S7, the unassigned area found in the search in step S6 is assigned as an area for recording the non-real-time data. The non-real-time data is then recorded into the assigned area while performing a verification process.

Figure 6:
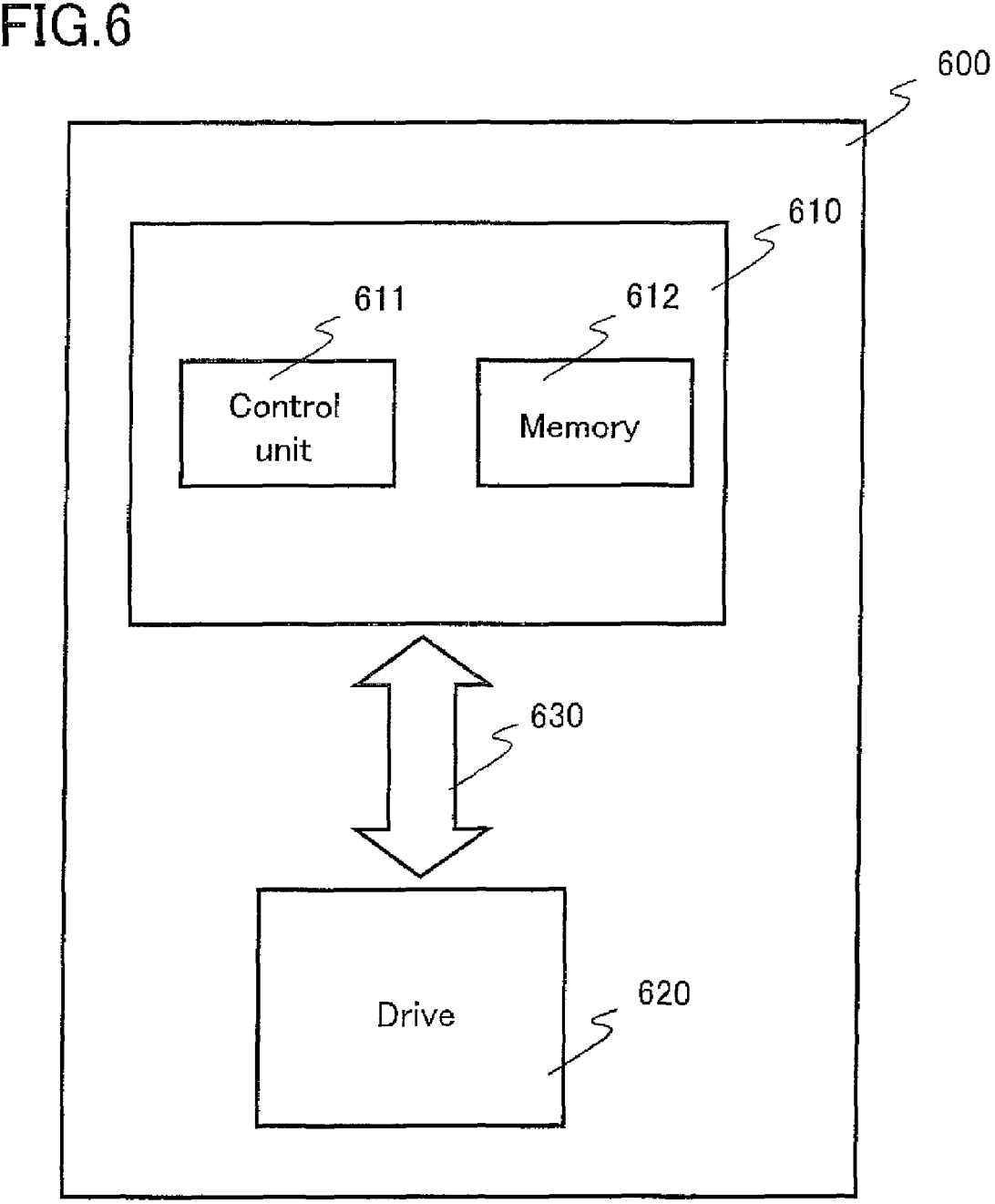
FIG. 6 is a block diagram showing an example of the configuration of the information recording/reproduction device 600 according to the present invention.

FIG. 6 shows an example of the configuration of the information recording/reproduction device 600 according to the present invention.

The information recording/reproduction device 600 is an device which performs recording and/or reproduction for an optical disc. The information recording/reproduction device 600 includes a system control device 610, a drive device 620, and an interface 630 for connecting the system control device 610 to the drive device 620. The system control device 610 may be a personal computer.

The system control device 610 controls the operation of the drive device 620, by outputting a control signal to the drive device 620.

The drive device 620 performs an access to the optical disc in accordance with the control signal output from the system control device 610.

During the recording operation, the data to be recorded is provided from the system control device 610 to the drive device 620 through the interface 630, and the data is recorded onto the optical disc by the drive device 620.

During the reproduction operation, the data recorded onto the optical disc is reproduced by the drive device 620, and the reproduced data is provided to the system control device 610 through the interface 630.

The system control device 610 includes a control unit 611 and a memory 612. The procedure of the recording method shown in FIG. 5 is, for example, stored in the memory 612 in the form of a program. The control unit 611 executes the program stored in the memory 612. The control unit 611 may be, for example, a processor such as a CPU (Central Processing Unit). When the control unit 611 executes the program implementing the procedure of the recording method shown in FIG. 5, the system control device 610 functions as a control device for controlling the execution of the recording process corresponding to the recording method shown in FIG. 5, and the information recording/reproduction device 600 functions as a recording device for executing the recording process corresponding to the recording method shown in FIG. 5.

The system control device 610 may be formed on a single semiconductor chip. Alternatively, it is possible that the control unit 611 and the memory 612 are formed on the respective separate semiconductor chips.

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention is useful in providing a control device, a control method, a recording device and a recording method, which are capable of providing a higher priority to the recording of non-real-time data even if the recording positions of the non-real-time data are more or less apart from each other, in the case where both the real-time data and the non-real-time data are to be recorded.

The invention claimed is:

1. A control device for controlling the recording of data onto an information recording medium where the number of re-writing data onto the same area is limited, the control device comprising:
   means for determining whether data to be recorded is real-time data or non-real-time data;
   means for, when it is determined that the data to be recorded is real-time data, recording the real-time data using a one-way recording method onto a second area which is defined in advance within a first area which is assigned in advance on the information recording medium; and
   means for, when it is determined that the data to be recorded is non-real-time data, searching for an unassigned area from a predetermined address within the first area and recording the non-real-time data onto the unassigned area found as a result of the search,
   wherein a leading address of the first area is smaller than a leading address of the second area, and the search for the unassigned area for recording the non-real-time data is also performed from the leading address of the second area if the unassigned area is not found between the leading address of the first area and the leading address of the second area.

2. A control device according to claim 1, wherein
   the non-real-time data includes data for an index file, data for a clip information file and data for a playlist file,
   the search for the unassigned area for recording the data for the index file is started from a leading address of the first area, and
   the search for the unassigned area for recording the data for the clip information file or the data for the playlist file is started from an area adjacent to an area where the data for the index file has been recorded.

3. A control device according to claim 1, wherein
   the non-real-time data includes data for a clip information file and data for a playlist file,
   the search for the unassigned area for recording the data for the clip information file is performed in a predetermined direction from an area adjacent to an area where the data for the playlist file has been recorded, and the search for the unassigned area for the data for the playlist file is performed in a direction opposite to the predetermined direction from an area adjacent to an area where the data for the clip information file has been recorded.

4. A control method for controlling the recording of data onto an information recording medium where the number of re-writing data onto the same area is limited, the control method comprising the steps of:

determining whether data to be recorded is real-time data or non-real-time data;

when it is determined that the data to be recorded is real-time data, recording the real-time data using a one-way recording method onto a second area which is defined in advance within a first area which is assigned in advance on the information recording medium; and when it is determined that the data to be recorded is non-real-time data, searching for an unassigned area from a predetermined address within the first area and recording the non-real-time data onto the unassigned area found as a result of the search, wherein a leading address of the first area is smaller than a leading address of the second area, and the search for the unassigned area for recording the non-real-time data is also performed from the leading address of the second area if the unassigned area is not found between the leading address of the first area and the leading address of the second area.

5. A control method according to claim 4, wherein the non-real-time data includes data for an index file, data for a clip information file and data for a playlist file, the search for the unassigned area for recording the data for the index file is started from a leading address of the first area, and the search for the unassigned area for recording the data for the clip information file or the data for the playlist file is started from an area adjacent to an area where the data for the index file has been recorded.

6. A control method according to claim 4, wherein the non-real-time data includes data for a clip information file and data for a playlist file, the search for the unassigned area for recording the data for the clip information file is performed in a predetermined direction from an area adjacent to an area where the data for the playlist file has been recorded, and the search for the unassigned area for the data for the playlist file is performed in a direction opposite to the predetermined direction from an area adjacent to an area where the data for the clip information file has been recorded.

7. A recording device comprising:

a drive device for recording data onto an information recording medium where the number of re-writing data onto the same area is limited; and a control device for controlling the drive device, wherein the control device includes:

means for determining whether data to be recorded is real-time data or non-real-time data;

means for, when it is determined that the data to be recorded is real-time data, recording the real-time data using a one-way recording method onto a second area which is defined in advance within a first area which is assigned in advance on the information recording medium; and means for, when it is determined that the data to be recorded is non-real-time data, searching for an unassigned area from a predetermined address within the first area and recording the non-real-time data onto the unassigned area found as a result of the search, wherein a leading address of the first area is smaller than a leading address of the second area, and the search for the unassigned area for recording the non-real-time data is also performed from the leading address of the second area if the unassigned area is not found between the leading address of the first area and the leading address of the second area.

8. A recording method comprising the steps of:

recording data onto an information recording medium where the number of re-writing data onto the same area is limited; and controlling the recording of the data, wherein the step of controlling the recording of the data includes the steps of:

determining whether data to be recorded is real-time data or non-real-time data;

when it is determined that the data to be recorded is real-time data, recording the real-time data using a one-way recording method onto a second area which is defined in advance within a first area which is assigned in advance on the information recording medium; and when it is determined that the data to be recorded is non-real-time data, searching for an unassigned area from a predetermined address within the first area and recording the non-real-time data onto the unassigned area found as a result of the search, wherein a leading address of the first area is smaller than a leading address of the second area, and the search for the unassigned area for recording the non-real-time data is also performed from the leading address of the second area if the unassigned area is not found between the leading address of the first area and the leading address of the second area.

* * * * *